Patented Oct. 19, 1954

2,692,278

UNITED STATES PATENT OFFICE 2,692,278

PROCESS FOR PREPARING MAHOGANY SULFONATES

Gordon W. Duncan, Westfield, N. J., assignor to Standard Oil Development Company, a corporation of Delaware No Drawing. Application January 5, 1951, Serial No. 204,683

5 Claims. (Cl. 260—501)

This invention relates to a process for the production of mahogany sulfonates from mahogany acids by an improved method of neutralization and phase separation employing triethanolamine as the neutralizing agent.

It is an object of this invention to provide a process for the complete recovery of sulfonic acid constituents from an acid oil containing the same by a neutralization process employing triethanolamine as the neutralizing agent to convert the mahogany acids to their triethanolamine salts. The process takes advantage of the complete separation afforded by reason of the substantially total insolubility of the triethanolamine salts in the oil containing the mahogany sulfonic acids.

The production of oil-soluble sulfonates by the treatment of a hydrocarbon oil with sulfuric acid or other sulfonating agent to form sulfonic acids and subsequent conversion of the sulfonic acids to sulfonates has been well described. Prior art processes describe the neutralization of the sulfonic acids with such materials as inorganic bases such as sodium hydroxide, sodium carbonate, calcium hydroxide, lime, or with organic bases such as amines, alkylolamines, etc.

According to the present invention, sulfonic acids contained in an acid oil resulting from the treatment of a hydrocarbon oil with strong sulfuric acid or other sulfonating agent are converted to oil-soluble sulfonates by treatment of the acid oil with a sufficient excess of triethanolamine whereby phase separation occurs resulting in an upper oil layer and a lower triethanolamine salt layer. Due to the more complete insolubility of triethanolamine salts in the oil a more complete recovery of the salts by phase separation is permissible.

The sulfonation process takes place in a manner well known in the sulfonation art. Briefly, a hydrocarbon oil of appropriate viscosity is sulfonated under such conditions as to produce a maximum of the higher molecular weight or oil-soluble sulfonic acids (mahogany acids) which remain dissolved in the acid oil. Acid sludge to a more or less considerable degree is always formed during the sulfonation. The sludge is separated and the acid oil is then treated for the recovery of sulfonic constituents therefrom. However, prior to said recovery in order to obtain a final sulfonate product free of inorganic salt, the acid oil is preferably contacted with a small amount of a finely-divided filter aid, preferably diatomaceous earth or other siliceous material to effect removal of sludge, tar, resin, free sulfuric acid, and other finely-divided organic and inorganic solids and liquids known collectively as pepper sludge. The oil is filtered and pressed to remove the sludge-filter aid complex after which it is blown, preferably with air, to remove any residual sulfur dioxide. At this point the acid-treated, filtered and $SO_2$ free oil containing in solution only the sulfonic acids is ready for neutralization. An excess of triethanolamine is mixed with the oil and so treated as to produce intimate contact between the oil and the neutralizing agent. During the treatment complete neutralization is effected and sufficient excess triethanolamine is maintained to effect rapid separation of the mixture into two phases; an upper phase containing oil from which the sulfonic acids were extracted, and a lower phase containing in solution the triethanolamine sulfonates free of inorganic salts. The layers are separated, the upper layer being substantially free of any oil-soluble sulfonic acids. The triethanolamine neutralizing agent is substantially immiscible with the neutralized oil and has a greater density than the density of the oil. Substantially all of the sulfonic acid present in the original acid oil is recovered in the lower layer in the form of triethanolamine salts of the sulfonic acids.

In carrying out the treatment with triethanolamine usually 5 to 100% by volume excess of the amine is used, preferably about 10 to 50% excess.

Rapid phase separation occurs at room temperature but separation is even more rapid and complete when higher temperatures up to 200° F. or above are employed and the selection of temperature is a matter of judgment of the operator. Temperatures above room temperature are preferred, generally in the range of 80–180° F.

The following examples are given for the purpose of illustrating the invention.

Example 1

A solvent extracted naphthenic (Coastal) stock of about 60 SSU/210° F. viscosity was heavily treated with strong sulfuric acid (98%) to yield a sludge layer which was discarded, and an acid oil layer. Analysis of the acid oil layer revealed that it contained 10 weight % of sulfonic acids of approximately 470 average molecular weight. At room temperature 11.8 grams of triethanolamine (100% excess above theoretical) was added to 189.5 grams of the acid oil. A triethanolamine sulfonate concentrate to the extent of 56 grams settled out rapidly. A clear light colored oil amounting to 145.5 grams constituted the upper layer and the same was decanted. The oil layer was practically devoid of sulfonic acid or sulfonate material.

Example 2

An experiment similar to that in Example 1 was next carried out at a higher temperature. 1200 grams of acid oil of Example 1 resulting from the sulfuric acid treatment was treated at 120° F. with 50 grams of triethanolamine (37% excess). A sulfonate phase amounting to 322 grams and an oil phase amounting to 927 grams separated very rapidly. Phase separation was more complete and more rapid at the higher temperature.

In each of the above examples the excess triethanolamine is recovered by subjecting the mixture containing the triethanolamine salts of the sulfonic acids to distillation preferably under vacuum. In such operation the triethanolamine is vaporized, condensed and recovered. Any traces of triethanolamine present in the oil layer are likewise recovered by the same technique.

In many instances it may be desirable to separate the sulfonic acids finally as metallic salts. In this event the triethanolamine sulfonates are decomposed by metathesis in a manner well known in the art by subjecting the sulfonates to reaction with the desired metallic compound in the form of metal oxide, hydroxide, carbonate, etc. The triethanolamine in this decomposition reaction is then distilled off again preferably under vacuum. The process is illustrated by the following examples.

Example 3

A portion of the amine sulfonate concentrate obtained in Example 1 was dissolved in water to give a cloudy viscous solution. A portion of said solution amounting to 53.7 grams was mixed with 20 grams of an extracted Coastal oil and 3 grams of a 20% aqueous sodium hydroxide solution. These constituents were agitated and heated to 320° F. to drive off water and to evaporate the triethanolamine. The product was a sodium sulfonate concentrate of the original sulfonic acids dissolved in the oil.

A similar experiment was followed employing 14 grams of 20% aqueous calcium chloride solution in place of the sodium hydroxide solution. The mixture was heated to 330° F. Triethanolamine hydrochloride precipitated and the calcium sulfonate concentrate was decanted.

Example 4

100 grams of the sulfonate phase obtained in Example 2 was mixed with 40 grams of an extracted Coastal oil and 7 grams of calcium chloride dissolved in 65 grams water. The mixture was heated to 225° F. Some $SO_2$ was evolved during the initial heating and the color of the mixture darkened somewhat. 1 gram of calcium hydroxide was added and the mixture now became light in color. Heat was added until the mixture reached 320° F. An additional 20 grams of oil was added to reduce the viscosity. 136 grams of the oil-calcium sulfonate phase was decanted from a crystalline precipitate. The material was mixed with additional aqueous calcium chloride, heated to 310° F. and allowed to stand. Crystals and a viscous clear liquid (triethanolamine) separated. The oil-calcium sulfonate phase was separated and refined by heating and filtering through a filter aid. The product was analyzed and the following data obtained:

| | |
|---|---|
| Calcium sulfonate | 28%. |
| Calcium | 1.7%. |
| Chlorine | 0.98%. |
| Sulfur | 1.97%. |
| Nitrogen | 0.04%. |
| Neutralization number | 1.0 acid. |

The hydrocarbon oil subjected to sulfonation is a distillate, raffinate or solvent extract of the proper viscosity range. Distillates are chosen having viscosities in the range of 100 to 2000 SSU at 100° F.; raffinates in the range of 80 to 1000 SSU at 100° F.; and solvent extracts up to 150,000 SSU at 100° F. In the case of raffinates and distillates there is an advantage in sulfonate yield and color secured by diluting the stock prior to sulfonation with a narrow-boiling, aromatic-free, and olefin-free paraffin hydrocarbon in amounts sufficient to impart to the diluted stock a viscosity of 75–200, preferably 80–120 SSU at 100° F. Paraffinic naphthas boiling in the range of 100–120° C. or in the range of 120–140° C. are preferred. The same advantages accrue by diluting solvent extracts with an acid-treated gas oil or kerosene boiling within the range of 400–600° F. in amounts sufficient to reduce the viscosity of the extract stock to 80–120 SSU at 100° F.

The solvent extracts may be produced by the extraction of hydrocarbon oils with such solvents as phenol, sulfur dioxide, sulfur dioxide benzene mixtures, aniline, nitrobenzene, furfural, dichlordiethylether, etc.

The sulfuric acid employed as the sulfonating agent may vary in strength from 90%, preferably 98%, sulfuric acid to fuming acid of 100% $SO_3$ strength. The sulfonating agent may also be liquid $SO_3$, or gaseous $SO_3$ containing $SO_2$ and inert diluent gases, or chlorosulfonic acid, fluorosulfonic acid, etc. Sulfuric acid is the preferred agent.

The sulfonation treatment may be carried out in batch, continuous, semi- or complete countercurrent operation. The acid treatment is carried out in agitators or in a tower column. The removal of sludge and pepper sludge after the acid treatment is accomplished by centrifuging, by treatment with filter aid, followed by settling or filtration, or by naphtha dilution of the acid-oil followed by settling. $SO_2$ removal is brought about by stripping, such as vacuum stripping, or by blowing with air or other inert gases.

The process of this invention permits neutralization of sulfonic acids and simultaneous separation of triethanolamine sulfonates from acid oil. At the same time there is also produced a refined mineral oil which originally contained the sulfonic acids. The process allows the recovery of sulfonic acid constituents substantially completely without the use of extracting solvents such as aqueous alcohols. The recovery process is devoid of emulsion problems which sometimes are encountered in the extraction especially when using aqueous solvents for recovery of the sulfonic acid constituents.

Having described the invention in a manner such that it may be practiced by those skilled in the art, what is claimed is:

1. A process for recovering sulfonic acid constituents contained in an acid oil which comprises neutralizing the acid oil with triethanolamine in sufficient excess, in the range of 5 to 100 volume % above the amount required for neutralization, to dissolve the resulting triethanolamine sulfonates and form a separate liquid layer containing said sulfonates formed as a result of neutralization of the sulfonic acids, and separating the triethanolamine sulfonate layer from the oil layer.

2. In a process wherein a hydrocarbon oil is sulfonated with a sulfonating agent, the sludge separated and the acid oil neutralized, the improvement which comprises neutralizing the acid oil with triethanolamine in sufficient excess, in the range of 10 to 50 volume % above the amount required for neutralization, to dissolve triethanolamine sulfonates resulting from the neutralization and form a separate layer therewith, and separating the layer containing the triethanolamine sulfonates from the oil.

3. A process according to claim 2 in which the sulfonating agent is fuming sulfuric acid.

4. A process according to claim 2 in which the neutralization mixture is heated to a temperature between 80° F. and 180° F. to facilitate phase separation.

5. A process according to claim 1 in which the excess triethanolamine is about 37 volume % to 100 volume % over that required for neutralization.

References Cited in the file of this patent

UNITED STATES PATENTS

| Number | Name | Date |
|---|---|---|
| 2,061,601 | Steik | Nov. 24, 1936 |
| 2,204,326 | Steik | June 11, 1940 |
| 2,357,866 | Archibald et al. | Sept. 12, 1944 |
| 2,519,930 | Riethof et al. | Aug. 22, 1950 |
| 2,535,784 | Cohen | Dec. 26, 1950 |
| 2,559,439 | Jones | July 3, 1951 |
| 2,560,479 | Riethof et al. | July 10, 1951 |